United States Patent [19]

Paefgen et al.

[11] Patent Number: 4,759,568
[45] Date of Patent: Jul. 26, 1988

[54] INSTRUMENT PANEL FOR A MOTOR CAR

[75] Inventors: Franz Paefgen, Schwaigern; Hermann Guhl, Tuebingen, both of Fed. Rep. of Germany

[73] Assignee: Audi AG, Ingolstadt, Fed. Rep. of Germany

[21] Appl. No.: 34,273

[22] Filed: Apr. 3, 1987

[30] Foreign Application Priority Data

Apr. 5, 1986 [DE] Fed. Rep. of Germany ....... 3611486

[51] Int. Cl.⁴ .............................................. B60R 21/16
[52] U.S. Cl. ...................................... 280/732; 180/90; 280/752; 296/70
[58] Field of Search .................. 280/732, 752; 296/70; 180/90

[56] References Cited

U.S. PATENT DOCUMENTS 3,897,848  8/1975  Arnstson et al. .................... 280/752
4,347,276  8/1982  Weber et al. ........................ 280/752
4,391,465  7/1983  Piano .................................... 180/90

FOREIGN PATENT DOCUMENTS 3116538  11/1982  Fed. Rep. of Germany ...... 280/732

Primary Examiner—Kenneth R. Rice
Attorney, Agent, or Firm—Kane, Dalsimer, Sullivan, Kurucz, Levy, Eisele and Richard

[57] ABSTRACT

An instrument panel for a motor car comprises a beam extending over the whole width of the passenger compartment and forming a pre-assembled unit with all instruments and air supply and exit channels and openings and with a compartment for accommodating an airbag system for the front passenger. The instrument panel is completed by an upper cover and lower covers which are detachably connected to the beam and can be easily exchanged so that the instrument panel can be used for cars with or without an airbag and also a subsequent mounting of an airbag system is possible without difficulties.

10 Claims, 4 Drawing Sheets

INSTRUMENT PANEL FOR A MOTOR CAR

FIELD OF THE INVENTION

This invention refers to an instrument panel for a motor car, comprising a beam which extends over the whole width of the compartment of the car below the wind screen and to which the steering column and various other parts are attached.

DESCRIPTION OF THE PRIOR ART

With a known instrument panel of this kind (EP-A-No. 0141959) a pre-assembled instrument carrier consisting of numerous parts is mounted on the beam. Furthermore it is known (U.S. Pat. No. 3,042,137) to form the instrument panel as a complete pre-assembled unit ready for mounting which consists essentially of a one-piece body of foam material with a plane reinforcement insert.

The known instrument panels facilitate in some respect the assembly of the motor car and stylistic amendments but they cannot be adapted without considerable effort to the different safety regulations in the various countries.

SUMMARY OF THE INVENTION

It is the object of the invention to provide an instrument panel of the kind set forth which can be manufactured and assembled with low cost and which can easily be adapted to different safety regulations.

In order to achieve this object it is proposed that the beam is formed as a pre-assembled unit with all instruments and air condition channels and air exit openings, and that an upper cover consisting of a molded article of foam material with embedded planar reinforcement elements on one hand and lower covers on the other hand are connected to the beam.

With the proposed instrument panel the beam with the built-in instruments and the air passages and air exit openings forms the unchangeable basic unit which is completed after mounting of the beam in the car body by the upper and lower covers which can have the form of simple trim panels or of compartments with or without lid. In order to make the beam suitable for a motor car with an air-bag system for the front passenger a space for the air-bag system can be provided from the beginning within the beam and an opening for the ejection of the air-bag can be provided in the wall of the beam facing towards the interior of the car. This opening can be closed by a plate for cars without an air-bag. For cars with an air-bag or for the subsequent change-over the air-bag is inserted into the beam, and there is now used a correspondingly altered upper cover which covers also said opening and which is formed in such way that upon release of the air-bag a lid in the upper cover is torn up. The lower covers can be formed as knee pads and displace the compartments or trim panels otherwise provided.

As mentioned before, if the instrument panel is provided with an air-bag system for the front passenger the upper cover is formed such that upon release of the airbag a lid is torn up to allow the air-bag to come out. In one embodiment of the invention the planar reinforcing element of the upper cover is provided with vertical cuts in the region of the air-bag resp. in the region of the opening in the front wall of the beam, said cuts forming a lid which tilts upwards about a line connecting the ends of the two cuts when the air-bag is released. This embodiment is very simple compared with the known devices (see f.i. German No. 32 20 272) where a lid is provided which is weakened along predetermined lines and which is torn up along those lines upon release of the air-bag, and is simultaneously folded in such way that it comes free along its upper edge from a clamp which holds said upper edge on the instrument panel in the rest position. Besides this the edges of the lid are visible which is aesthetically unsatisfying.

In a second embodiment of the upper cover for an instrument panel with an air-bag system the reinforcing element is provided with a rectangular cut-out delimited by two vertical and one horizontal edge in the region of the air-bag i.e., in the region of the opening in the front wall of the beam, and in the region of said cut-out a high-strength filament mat is foamed into the molded foam material article, said mat being connected to the reinforcing element along the horizontal edge of the cut-out.

BRIEF DESCRIPTION OF THE DRAWINGS

The instrument panel consists essentially of a light-alloy beam 1 which extends over the whole width of the vehicle compartment below the windshield and which carries an instrument top 2 and is provided with air exit openings 3 which are in communication with air channels (not shown) within the beam 1. The beam 1 is also provided with a recess 4 for accommodating an airbag for the front passenger, whereby the opening 5 in the front wall 6 facing the compartment enables the airbag to exit. Upon the beam 1 there is detachably arranged an upper cover element 7 which consists of a molded article of foam material extending over the whole length of beam 1 and having an embedded planar reinforcing element 8 (FIG. 3). Lower cover elements 9 and 10 are detachably fastened to the lower side of beam 1. In FIG. 1 these lower cover elements are simple trim panels or compartments with or without a lid.

In FIGS. 1 and 3 the instrument panel is shown without an airbag system for the front passenger. Thereby the opening 5 is covered by an ornamental molding 12 which extends along the whole length of the beam 1 and has openings corresponding to the air exit openings 3.

Figure 1:
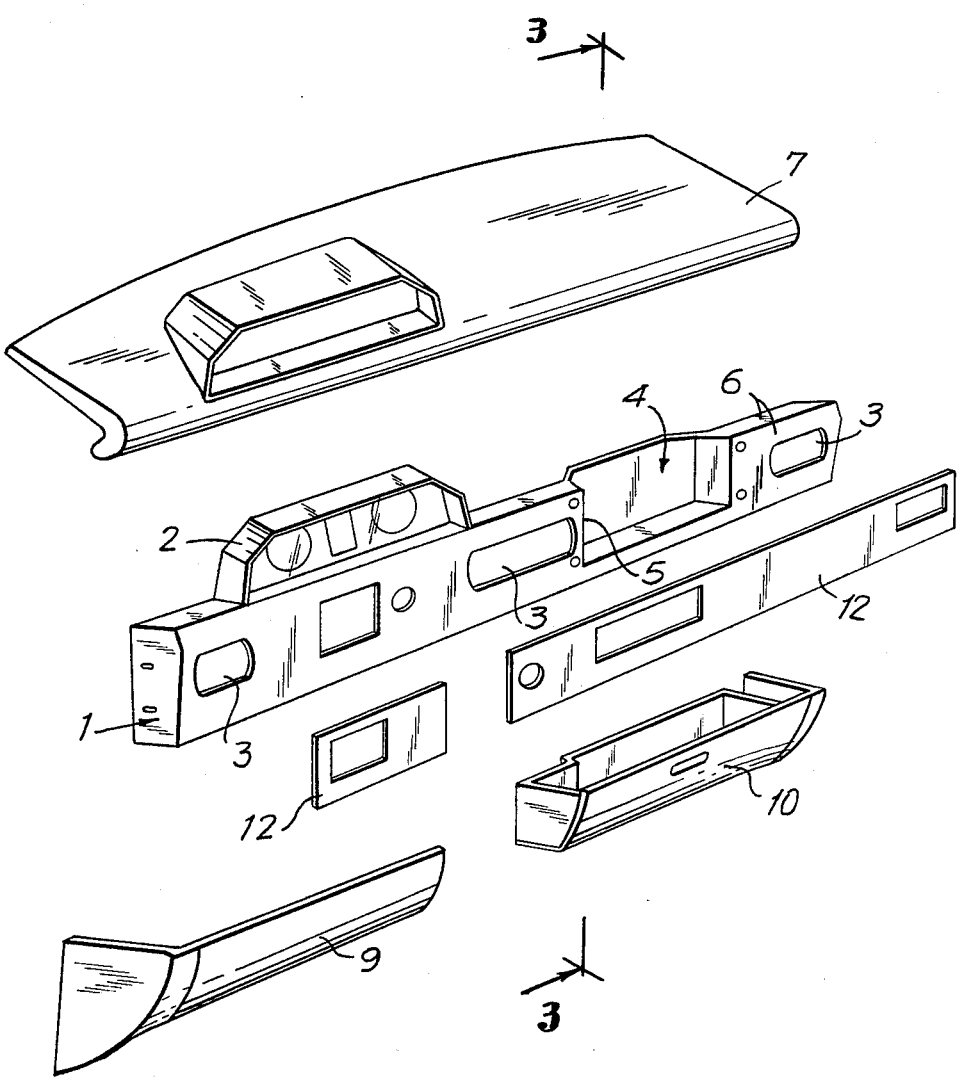
FIG. 1 is an exploded perspective view of an instrument panel without an airbag system for the front passenger.
Figure 2:
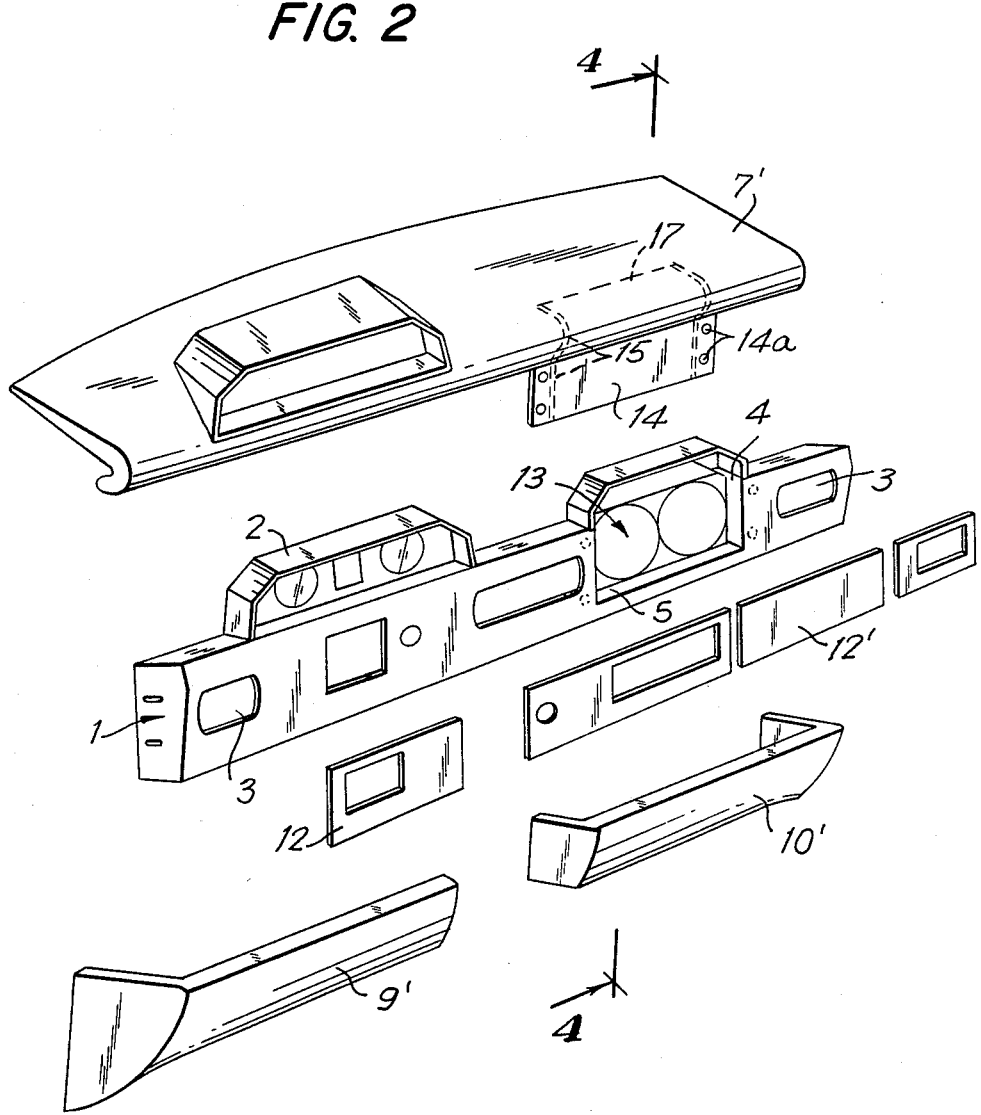
FIG. 2 is an exploded perspective view of an instrument panel with an airbag system for the front passenger.
Figure 3:
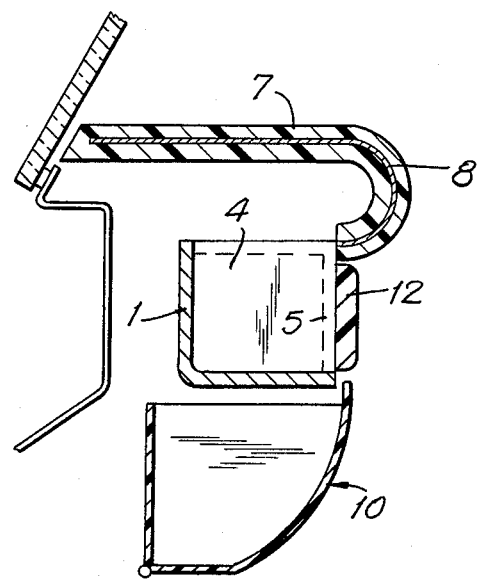
FIG. 3 is a section through the assembled unit along line 3—3 in FIG. 1

If the instrument panel shall be provided from the beginning or also subsequently with an airbag system for the front passenger such system 13 is inserted into the recess 4 (see FIGS. 2 and 4) and there is used an upper cover element 7' which is provided with an extension 14 covering the opening 5 and connected to beam 1 on both sides of opening 5 by screws 14a.

In the region of opening 5 there is formed from the reinforcing element 8' (FIGS. 4 to 6) a lid 16 by two vertical cuts 15. This lid 16 can tilt upon release of the airbag about a vertical line 17 (FIG. 5) which connects the ends of the cuts 15 whereby the foamed article 7' is torn up along these cuts 15. In order to facilitate the tearing embossments 24 (FIG. 6) can be provided on the backside of the molding 7. In this case the reinforcing member 8' consists preferably of a light alloy sheet. The lower covers 9' and 10' can be formed as knee pads which further diminish the danger of injuries at an accident. Upon the extension 14 there is arranged an own ornamental trim part 12'.

Figure 4:
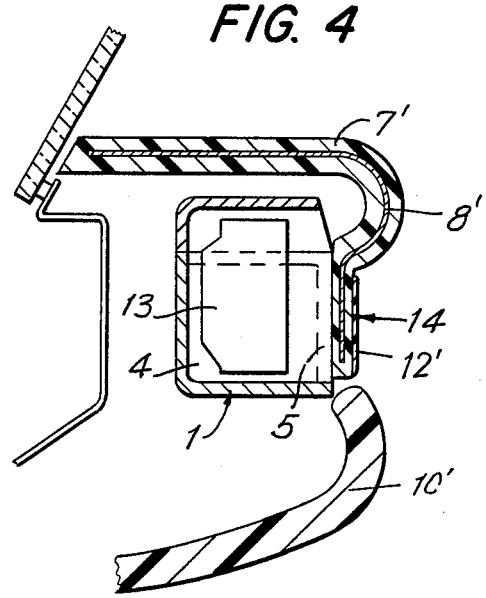
FIG. 4 is a section through the assembled unit along line 4—4 in FIG. 2
Figure 5:
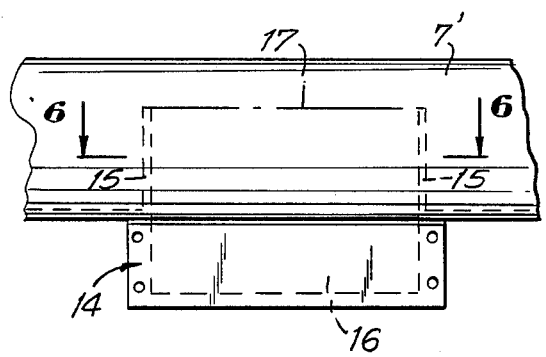
FIG. 5 is a partial view of the upper cover of FIG. 2 in the region of the airbag.
Figure 6:
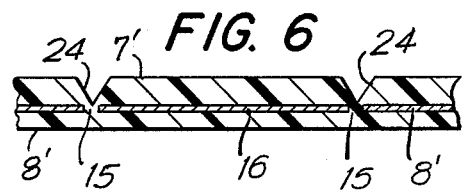
FIG. 6 is a sectional view along line 6—6 in FIG. 5.
Figure 7:
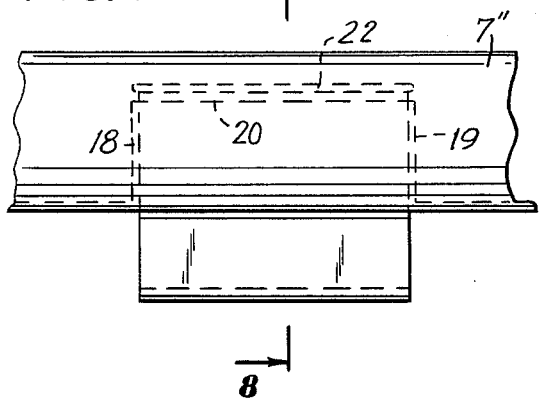
FIG. 7 is a partial view similar to FIG. 5 of a second embodiment of the upper cover for an instrument panel with an airbag system for the front passenger.
Figure 8:
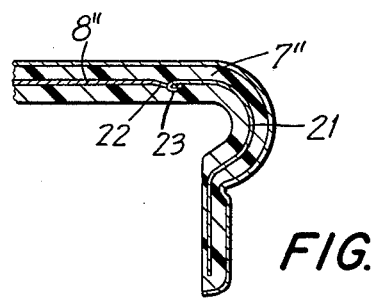
FIG. 8 is a sectional view taken along line 8—8 in FIG. 7.

The upper cover element 7" shown in FIGS. 7 and 8 differs from that one of FIGS. 4 to 6 essentially only in that here the reinforcing insert 8" which is again preferably a light alloy sheet has a cutout limited by two vertical edges 18 and 19 and a horizontal edge 20 in the region of the opening 5 in beam 1. Into the foam molding there is foamed in a high strength glass fiber mat 21 in the region of said cutout, said mat being connected to the reinforcing insert 8" along the horizontal 20 of the cutout by a hinge. To this end the reinforcing insert 8" is provided with a slot 22 which runs in parallel to said edge 20 and through which the end portion 23 of the mat 21 is inserted and bent back upon itself, as can be seen from FIG. 8. Th foam molding is again weakened along the vertical edges 18 and 19 by embossments (not shown) similar to the embossments 24 in FIG. 6. Upon release of the airbag the foam molding is torn up along these embossments and the portion of the foam molding which is reinforced by the glass fiber mat 21 and firmly connected to the reinforcing element 8" can turn up, there being no danger that this flap will become loose.

What we claim is:

1. An instrument panel for a motor car, comprising a beam which extends over the whole width of the passenger compartment below the wind screen, said beam being formed as a pre-assembled unit with all instruments and with air supply channels and air exit openings, an interchangeable upper cover comprising a foam material molding extending over the whole length of the beam and having a planar reinforcing element embedded therein, and one or more interchangeable lower covers, said upper and lower covers being detachably connected to said beam and wherein said beam has a compartment for accommodating an airbag for the front passenger and comprising a front wall facing toward the passenger compartment and having an opening for enabling an exit of the airbag when released, and means for attaching different said interchangeable upper and lower covers to the beam, the covers being attached depending on whether an airbag is to be attached to said instrument panel.

2. An instrument panel according to claim 1 wherein said beam comprises a compartment for accomodating an airbag system for the front passenger, a front wall facing the passenger compartment, an opening in said wall in the region of said compartment for enabling an exit of the airbag upon release, said opening being covered by the upper cover, the reinforcing element of said upper cover having a flap in the region of said opening, said flap being formed by two vertical cuts, and a line connecting the ends of said cuts forms a hinge axis about which said flat can turn up.

3. An instrument panel according to claim 1 wherein said beam comprises a compartment for accomodating an airbag system for the front passenger, a front wall facing the passenger compartment, an opening in said wall in the region of said compartment for enabling an exit of the airbag upon release, said opening being covered by said upper cover, the reinforcing element of said upper cover having a cutout in the region of said opening, said cutout being limited by two vertical edges and a horizontal edge, a high-strength filament mat being foamed into the foam material molding in the region of said cutout, said mat being connected to the reinforcing element in the region of the horizontal egde of the cutout.

4. An instrument panel according to claim 3 wherein the reinforcing element is provided with slot parallel to and adjacent to said horizontal edge for accomodating an end portion of said mat which is pushed through said slot and thereafter bent upon itself.

5. An instrument panel according to claim 3 wherein the fiber mat consists of glass fibers.

6. An instrument panel according to claim 1 wherein said lower covers are simple trim panels.

7. An instrument panel according to claim 1 wherein said means for interchangeably attaching different upper and lower covers to the beam comprises one or more screws, and a reinforcing element extension.

8. An instrument panel according to claim 4 wherein the fiber mat consists of glass fibers.

9. An instrument panel according to claim 1 wherein said lower covers are glove compartments.

10. An instrument panel according to claim 1 wherein said lower covers are knee pads.

* * * * *